United States Patent
Kim

(10) Patent No.: US 12,336,670 B2
(45) Date of Patent: Jun. 24, 2025

(54) HEATED SCOOPING DEVICE

(71) Applicant: Chong S. Kim, Holmdel, NJ (US)

(72) Inventor: Chong S. Kim, Holmdel, NJ (US)

(*) Notice: Subject to any disclaimer, the term of this patent is extended or adjusted under 35 U.S.C. 154(b) by 442 days.

(21) Appl. No.: 17/544,670

(22) Filed: Dec. 7, 2021

(65) Prior Publication Data

US 2023/0172396 A1     Jun. 8, 2023

(51) Int. Cl.
*A47J 43/28*     (2006.01)
*H05B 1/02*     (2006.01)
*H05B 3/20*     (2006.01)

(52) U.S. Cl.
CPC .......... *A47J 43/282* (2013.01); *H05B 1/0252* (2013.01); *H05B 3/20* (2013.01); *H05B 2203/03* (2013.01)

(58) Field of Classification Search
CPC ....... A47J 43/282; H05B 1/0252; H05B 3/20; H05B 2203/03
USPC .......................................................... 425/279
See application file for complete search history.

(56) References Cited

U.S. PATENT DOCUMENTS

| | | |
|---|---|---|
| 1,323,523 A | 12/1919 | Cox |
| 1,971,577 A | 8/1934 | Parker |
| 1,974,051 A | 9/1934 | Kelly |
| 2,256,770 A | 9/1941 | Armstrong |
| 2,260,689 A | 10/1941 | Carroll |
| 2,715,175 A | 8/1955 | Jacobson |
| 2,859,325 A | 11/1958 | Lea |
| 3,304,890 A | 2/1967 | Sloan et al. |
| 3,513,290 A | 5/1970 | Burley |
| 3,787,163 A | 1/1974 | Denison et al. |
| 3,809,520 A | 5/1974 | Wilk et al. |
| 3,992,604 A | 11/1976 | Leddy |
| 4,005,310 A | 1/1977 | Baisch |
| 4,091,813 A | 5/1978 | Shaw et al. |

(Continued)

FOREIGN PATENT DOCUMENTS

WO     2017029468 A1     2/2017

OTHER PUBLICATIONS

"FAQ: Overview", That!, thatinventions.com, Dec. 31, 2015 https://web.archive.org/web/20151231061104/https://us.thatinventions.com/pages/faq.

(Continued)

*Primary Examiner* — Alison L Hindenlang
*Assistant Examiner* — Erica Hartsell Funk
(74) *Attorney, Agent, or Firm* — Jessica Smith; LOZA & LOZA, LLP

(57) ABSTRACT

A heated scooping device provides efficient handling of dense comestibles. The device comprises a head portion having a bowl section and rim. The head portion may be affixed to a handle portion extending from the head portion. A heating means including a heating unit and heating element supplies electricity to rim portion fashioned with the heating element. Power is supplied to the heating means via a power means found in the device. A retainer positioned between the bowl section and heating element stabilizes and isolates the heating element from the bowl section. A method for manufacturing a heated scooping device includes affixing a handle portion to a head portion having a bowl section and rim, providing a heating means to heat a portion of the rim, and positioning a retainer between the bowl section and the heating element for electrically and thermally isolating the heating element from the bowl section.

21 Claims, 9 Drawing Sheets

(56) References Cited

U.S. PATENT DOCUMENTS

| | | | |
|---|---|---|---|
| 4,386,900 | A | 6/1983 | Sultan |
| 4,553,921 | A | 11/1985 | Lamphere |
| 4,755,653 | A * | 7/1988 | Townsend ............... F24C 7/088 |
| | | | 340/521 |
| 5,000,672 | A | 3/1991 | St. James et al. |
| D329,784 | S | 9/1992 | Wong |
| 5,345,059 | A | 9/1994 | Wen |
| 5,837,296 | A | 11/1998 | Virkler |
| 6,060,695 | A | 5/2000 | Harle et al. |
| 7,261,537 | B2 | 8/2007 | Mitz |
| 7,427,194 | B1 | 9/2008 | Lopez |
| 8,591,214 | B2 | 11/2013 | Moore |
| 9,867,505 | B2 | 1/2018 | Barak et al. |
| 10,187,929 | B1 | 1/2019 | McFadden |
| 2007/0292551 | A1 | 12/2007 | Taylor et al. |
| 2015/0266190 | A1 * | 9/2015 | Bohmer ................. B26B 21/48 |
| | | | 30/34.05 |
| 2015/0382401 | A1 | 12/2015 | Dietz et al. |
| 2017/0080583 | A1 | 3/2017 | Esteban Gonzalez |
| 2017/0339751 | A1 * | 11/2017 | Meng ..................... G01K 1/143 |
| 2018/0140140 | A1 | 5/2018 | Wilson |
| 2019/0117022 | A1 | 4/2019 | Connally |

OTHER PUBLICATIONS

"Heated Gourmet Ice Cream Scoop", Farm Show, farmshow.com, 1990 (vol. #14, Issue #2, p. #30) https://www.farmshow.com/a_article.php?aid=9791.

"SVANKi—The Heated Ice Cream Scoop", Kickstarter, kickstarter.com, Nov. 1, 2018 https://web.archive.org web/20181101103345/https://www.kickstarter.com/projects/svanki/svanki-the-electric-ice-cream-scoop.

* cited by examiner

HEATED SCOOPING DEVICE

FIELD OF THE INVENTION

The disclosure relates generally to scooping devices, and more specifically to electrically-heated scooping devices for scooping comestibles.

BACKGROUND OF THE INVENTION

Frozen comestibles such as ice cream are kept in a freezer at a temperature between zero and −8° F. At this temperature, frozen food products are "solid". A utensil known as an ice cream scoop is employed to transfer from the container to serving dishes. An ice cream scoop consists of a bowl and a handle. In order to remove a bowlful of ice cream, a significant force has to be applied to overcome the "hardness" of ice cream in the container.

The required significant force needed to transfer the ice cream from the storage container to serving dishes poses many problems. For those individuals whose arm and or hand strength is compromised or suffer from severe arthritis, removing a scoop of ice cream is a daunting task. Even a healthy individual often is met with challenges and frustrations. For ice cream parlors, the inefficiency in scooping out the ice cream means delayed service and diminished workers' productivity, and ultimately, the business's profitability. This concept of scooping comestibles may also apply to comestibles that are also dense or viscous.

In an effort to facilitate the removal of the ice cream from the container, many creative methods have been proposed and taught by prior art. The prior teachings include having the bowl of the ice cream scoop to be in contact with hot water or by making a provision within the ice cream scoop for heated water/liquid to be filled, or by electrically heating the bowl. While there are small differences among various methods, the commonality they share is the heating of the entire bowl of the ice cream scoop before use. With the bowl heated, they teach that the force needed to remove the ice cream would be significantly reduced.

For example, U.S. Pat. No. 5,837,296 to Virkler teaches an ice cream scoop that is contiguously hollow in both the bowl and the handle. Warm tap water is used to fill the empty space prior to use. The shortcomings with such a device are the time needed for the scoop to be warmed, the limited heat capacity, the inconvenience of having to fill with the tap water, and the time needed for the tap to flow with water of the desired temperature.

U.S. Pat. No. 3,809,520 to Wilk proposes an ice cream scoop that is contiguously hollow in both the bowl and the handle, and the handle is outfitted for faucet connection. In this paradigm, warm water is continuously circulated through the handle and the bowl during use. The drawbacks with such a device are the inconvenience of having to connect the scoop to the faucet, and the time needed for the tap water to reach the desired temperature, and the time needed for the bowl to reach an appropriate temperature.

U.S. Pat. No. 3,992,604 to Leddy, U.S. Pat. No. 4,386,900 to Sultan, and U.S. Pat. No. 4,553,921 to Lamphere all illustrate the ice cream scoops whose scoop bowls are electrically heated. While electrically heated ice cream scoops are abundantly able to facilitate the ice cream removal from the storage container, there are obvious weaknesses: the time needed for the bowl to reach an effective temperature, and the danger of electrocution from exposed AC current, and the annoyance of having to connect to a power source, and the melting of ice cream from being exposed to a large heated surface area.

U.S. Pat. No. 5,000,672 to Halimi demonstrates an ice cream scoop with a resistive wire attached along the leading edge of the scoop and the electrical power provided by batteries. He asserts superiority in his art based on the heating being concentrated only along the leading edge and not the entire scooping bowl. A careful examination of his art, however, uncovers a lack of provision for reducing heat loss from heat redistribution onto the scoop bowl. In this manner, the cutting surface of the device will rapidly approach the ice cream temperature, rendering the device ineffective. Furthermore, heating of the entire scoop bowl will result in unwanted melting of the ice cream.

WO 2017029468A1 to Pala describes a resistive wire buried inside the leading edge of the scoop. The resistive wire is covered with an electrical insulator, but is thermally in contact with the metallic covering. Pala's invention suffers from the same shortcoming as that of Halimi, i.e. a lack of contingency for heat redistribution from the "leading edge" to the entire scoop bowl.

A device is needed that overcomes the above mentioned shortcomings.

BRIEF SUMMARY OF THE INVENTION

The disclosed subject matter provides a scooping device including an electrically-heated edge for easily scooping frozen, dense, and/or viscous comestibles such as ice cream. The device comprises a head portion having a bowl section and a rim. A back portion of head portion may be affixed to a handle portion that extends from the back portion. Heat may be supplied by a heating means including a heating element and a heating unit that provides electricity to the heating element in order to create heat. The heating element may circumnavigate at least a portion of the rim so that when the device is on, it can easily cut through frozen comestibles. A heating means for supplying heat to the heating element includes the heating element and a heating unit wired to the heating element that supplies electricity to the heating element. Connected to the heating means is a power means which supplies power to the heating means. A retainer is positioned between the bowl section and the heating element for retaining and electrically and thermally isolating the heating element from the bowl section so that the only heated part of the device that touches a frozen comestible being scooped is the heating element.

An additional embodiment may include a heating device having a microcontroller capable of executing one or more programs for controlling the power to the heating element in relation to one or more inputs. In this embodiment, the microcontroller is wired to a temperature sensor and is capable of executing a PID temperature control program. The program may adjust the power sent to the heating element in response to the one or more inputs. A first of the inputs comprises continuous temperature data related to the heating element while a second of the inputs comprises a plurality of user inputs constituting a plurality of temperature settings embodied in a multifaceted switch. The first and second inputs may be relayed from the temperature sensor and the multifaceted switch to the microcontroller in order to supply power to the heating element representative of the plurality of temperature settings.

An additional embodiment may include a heating device having a microcontroller wired to separate segments of the heating element and is capable of executing a temperature allocation program for allocating power to one or more specific segments of the separate segments in response to the one or more inputs. The one or more inputs may comprise a plurality of user inputs constituting a plurality of heating configurations embodied in a multifaceted switch. The one or more inputs may be relayed from the multifaceted switch to the microcontroller in order to supply power to the one or more specific segments representative of the plurality of heating configurations. It is noted that the plurality of heating configurations constitutes a hand scooping orientation of a user.

An additional embodiment may include a heating device having a microcontroller wired to an orientation sensor and is capable of executing a position-dependent temperature controller program for adjusting the power sent to the heating element in response to the one or more inputs. The one or more inputs may comprise continuous orientation data related to the heated scooping device and may constitute at least one of a heating configuration and a non-heating configuration. The one or more inputs may be relayed from the orientation sensor to the microcontroller in order to supply power to the heating element representative of at least one of the heating configuration and the non-heating configuration. Heating configuration may constitute a positioning of the head portion at or below an angle below a pitch axis of the orientation sensor and the non-heating configuration constitutes a positioning of the head portion at an angle above the angle below the pitch axis of the orientation sensor.

A method is provided for producing a heated scooping device. The method includes supplying a head portion having a bowl section and a rim and supplying a handle portion. A heating means may be provided for supplying heat to at least a portion of the heated scooping device. The heating means may include a heating element that partially circumnavigates the rim and a heating unit wired to the heating element that supplies electricity to the heating element. A power means wired to the heating means may be provided for supplying power to the heating means. Once internal componentry is properly positioned, the handle portion is affixed to the head portion and a retainer is positioned between the bowl section and the heating element for electrically and thermally isolating the heating element from the bowl section.

BRIEF DESCRIPTION OF THE DRAWINGS

The disclosed subject matter, objectives, and advantages thereof, will best be understood by reference to the following detailed description of an illustrative embodiment when read in conjunction with the accompanying drawings, wherein.

DETAILED DESCRIPTION

Reference now should be made to the drawings, in which the same reference numbers are used throughout the different figures to designate the same components.

It will be understood that, although the terms first, second, third, etc. may be used herein to describe various elements, these elements should not be limited by these terms. These terms are only used to distinguish one element from another element. Thus, a first element discussed below could be termed a second element without departing from the teachings of the present disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Figure 1:
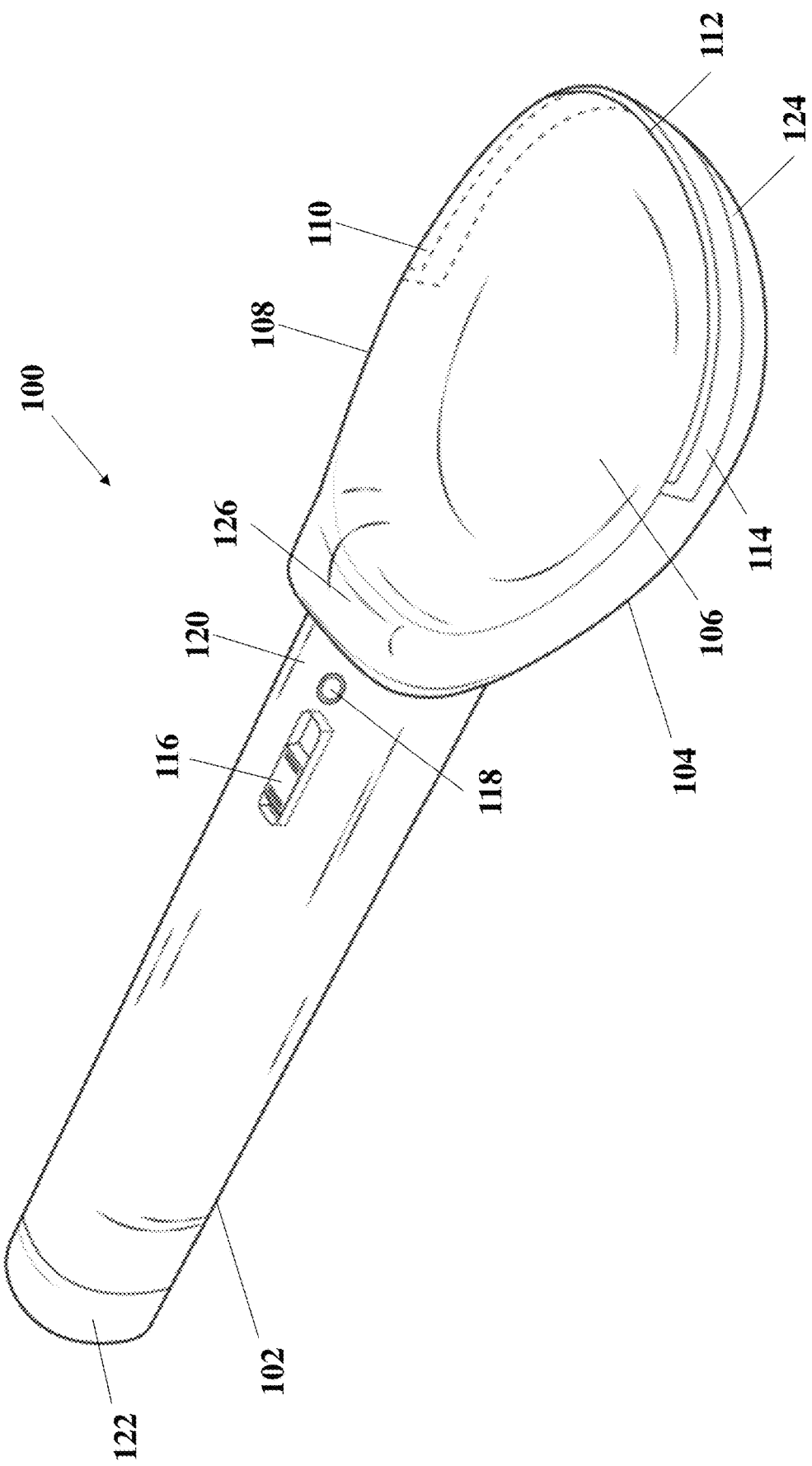
FIG. 1 displays a perspective view of a heated scooping device, as shown and described herein.

FIG. 1 displays a perspective view of a heated scooping device 100 for handling dense, frozen, and/or viscous comestibles. The scooping device 100 may comprise a handle portion 102 having a top end 120 and a bottom end 122. A head portion 104 having a bowl section 106, a bowl rim 108, a front portion 124 and a back portion 126 is affixed to handle portion 102 opposite bottom end 122. As shown, back portion 126 may comprise a thickness thicker than the rest of head portion 104. This may be used by a user to rest their thumb/inside/side of their hand while the user scoops comestibles. In other embodiments, the thicker back portion 126 may be absent, such as the embodiment of device 100 shown in FIG. 5.

At the front portion 124, a heating element retainer 114 and a heating element 110 are disposed about a portion of rim 108 (replacing rim 108 at this portion so that heating element retainer 114 is positioned between the bowl section 106 and the heating element 110). It is noted that the portion of rim 108 that is made up of heating element 110 may comprise a cutting edge 112 that is the portion of heating element 110 that may be used to puncture foods with a high density, frozenness, or viscosity (such as ice cream). For the purposes of this disclosure, the term "cutting edge" may refer to the exposed surface of heating element 110 not covered by retainer 114 (see FIGS. 7A and 7B). The heating element 110 and retainer 114 configuration may eliminate the heat and power (electricity) transfer from heating element 110 to the rest of bowl portion 106. Bottom end 122 may be removable from heated scooping device 100 in order to remove or replace a power source 304 (see FIG. 3). In addition, bottom end 122 may comprise components such as, but not limited to, contacts, leads, wires, and springs so that the circuit embodied in device 100 may be completed by being able to receive and transmit electricity from one or more additional components in device 100. In embodiments, heating element 110 and heating element retainer 114 may be configured so that heating element 110 and heating element retainer 114 are flush with the rest of bowl section 106 and rim 108. In additional embodiments, heating element 110 may extend substantially 180 degrees of the rim at front portion 124 of bowl section 106.

Eliminating power transfer between heating element 110 and bowl section 106 may provide benefits such as, but not limited to safety for a user if an electrical component of device 100 malfunctions Eliminating heat transfer between heating element 110 and bowl section 106 may provide benefits such as, but not limited to reduced melting of frozen comestibles (too much melting may make ice cream less enjoyable to eat), increased heating efficiency, decreased heating time, and increased separating ability of comestibles.

A switch 116 may be positioned on the outer surface of handle portion 102. Switch 116 may sit flush with the rest of the outer surface of handle portion 102 so that when device 100 is used to scoop comestibles, a user's hand will not accidentally turn switch 116 off since switch 116 doesn't sit above the outer surface of handle portion 102. In other embodiments, switch 116 may sit above the outer surface of handle portion 102 at positions such as, but not limited to on the bottom end 122. In further embodiments, switch 116 may be a sliding switch and may be oriented perpendicular to the downward force applied by a user's hand when using device 100. In addition, an indicator light 118 may be wired between switch 116 and heating element 110 and may light up when power is flowing through switch to heating element 110.

In embodiments, the shape of bowl section 106 may vary. As shown, bowl section 106 may comprise a bowl shape with the back portion 126 of bowl section 106 adjacent top end 120 and extending higher than the rest of rim 108 (which may allow for easier formation of scoops of ice cream). In other embodiments, rim 108 may dip adjacent the top end 120 so that the shape of rim 108 may resemble that of a shovel shape.

Figure 2:
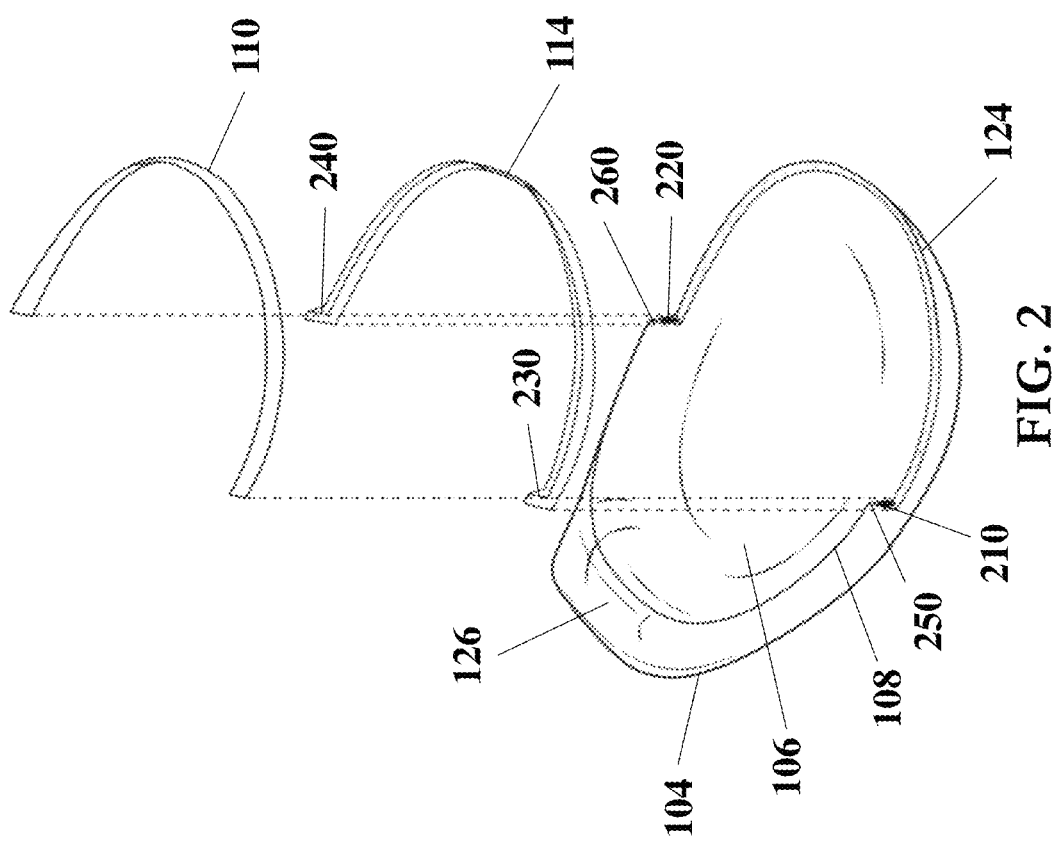
FIG. 2 displays a partially deconstructed view of a heated scooping device, as shown and described herein.

FIG. 2 displays a partially deconstructed view of a heated scooping device 100. As shown, heating element 110 is removed from heating element retainer 114, which is further removed from heated scooping device 100. Heating element retainer 114 may be made of a thermally and electrically insulative material that may isolate heating element 110 thermally and electrically from the rest of heated scooping device 100 while also allowing the ends of heating element 110 to attach to a pair of bowl contacts 210,220 that provide power to and send power away from heating element 110. When properly positioned, heating element 110 may be retained in heating element retainer 114 and may pass through retainer orifices 230,240 to contact the pair of bowl contacts 210,220 with each of its ends. In the configuration shown, heating element 110 may comprise a thin, triangular shape (rim or blade shaped) with an apex that acts as the cutting edge 112 of heating element 110. Due to the shape of heating element 110, electrons may flow less easily at the apex (smaller width), creating additional heat to more easily puncture frozen, dense, and/or viscous comestibles. In other embodiments, heating element 110 may comprise a thin, rectangular shape.

In embodiments, various fittings and attachment techniques and equipment (fastening means, male-female engagement, welding, adhesives, magnets) may be utilized in order for heating element 110 to affix to heating element retainer 114 and for heating element retainer 114 to affix to heated scooping device 100. Preferably, the fitting/attachment techniques used by the heating element 110, heating element retainer 114, and heated scooping device 100 may provide a sturdy fit into each element's respective locations, especially when heated scooping device 100 is being utilized by a user. For example, heating element 110 and/or heating element retainer 114 may comprise protrusions that extend from the ends of heating element 110 and/or heating element retainer 114 and wedge into the interior upper surfaces found in bowl orifices 250,260 and retainer orifices 230,240 while also contacting bowl orifices 250,260. In addition, heating element 110 and heating element retainer 114 may include protrusions located on the bottom of each of heating element 110 and heating element retainer 114 that may be received by heating element retainer 114 and heated scooping device 100 in order to provide additional reinforcement. For the purposes of creating a viable consumer product, device 100 may utilize various fitting and attachment techniques in order to provide a topical seamless transition between bull section 106, heating element 110, and heating element retainer 114.

In embodiments, heating element retainer 114 may be made of a material such as, but not limited to plastic, wood, fiberglass, and ceramic. In additional embodiments, it is noted that the materials making up heating element retainer 114 and bowl section 106 may be waterproof or waterproofed using conventional methods known in the art. For example, a liquid rubber may be utilized to waterproof heating element retainer 114 and bowl section 106.

Figure 3:
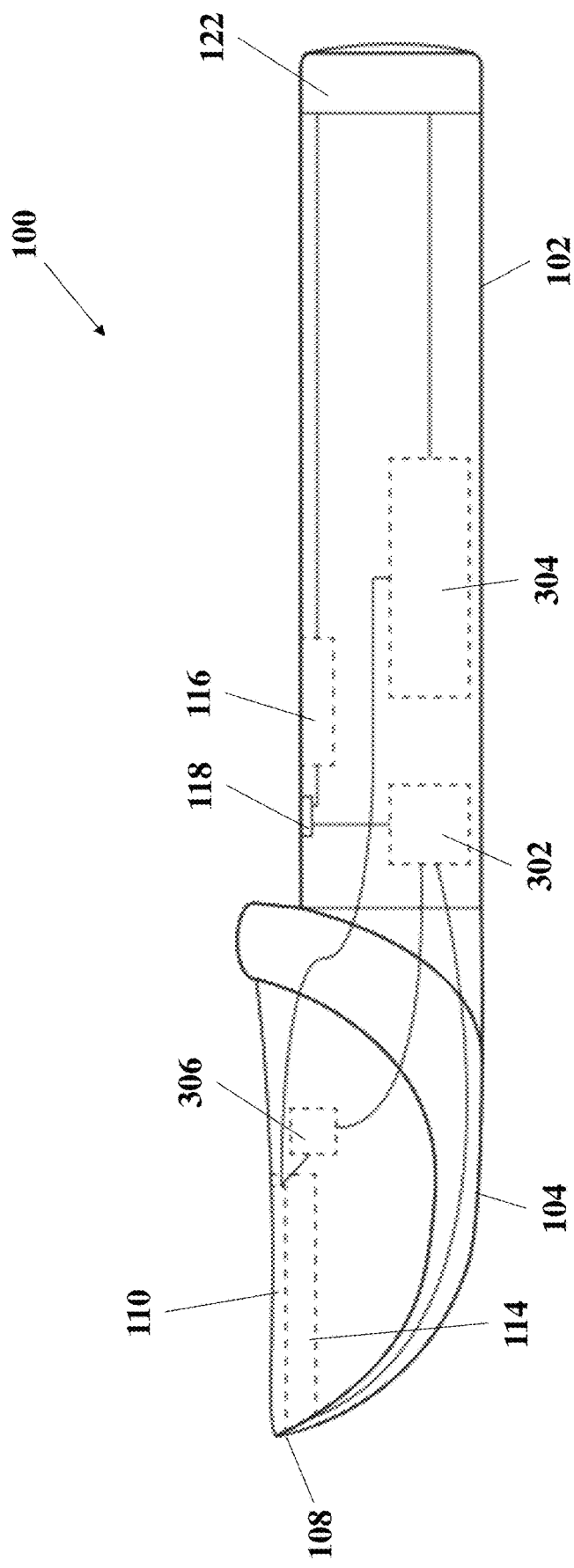
FIG. 3 displays a partial cross-sectional side view of a heated scooping device, as shown and described herein.

FIG. 3 displays a partial cross-sectional side view of a heated scooping device 100. As shown, device may include a power source 304 for providing electricity to heating unit 110 that comprises a microcontroller 302 wired to heating element 110. Microcontroller 302 may be capable of executing one or more programs for controlling the power to heating element 110 in relation to one or more inputs. In this instance the program may comprise PID temperature controller protocol, which, when switch 116 is moved to the on position, may allow microcontroller 302 to receive continuous input from temperature sensor 306 (wired to an end of heating element 110 and microcontroller 302) that may be used by the PID temperature control program to calculate the change in power needed to efficiently heat heating element 110 to a target temperature and provide that power to the heating element representing one or more temperature settings. It is noted that the interior of head portion 104 may be hollow, allowing for wires to run from components in the head portion 104 and into the handle portion 102.

A second of the inputs may comprise one or more of a plurality of user inputs constituting a plurality of temperature settings embodied in a multifaceted switch, which is not depicted, but may be integrated into bottom end 122 and may be fitted with components such as, but not limited to contacts, leads, wires, and springs that may allow the circuit embodied in device 100 to be completed by being able to receive and transmit electricity from one or more additional components in device 100. One skilled in the art may conceive of how the multifaceted switch may be constructed and integrated within device 100. Overall, the PID temperature controller program may be advantageous to run because it may prevent overshoots and lag, which may affect how smoothly device 100 may run. In addition, it may reduce wear on components of device 100.

In embodiments, microcontroller 302 may be a PID temperature controller, as opposed to just running a PID temperature controller program.

Figure 4:
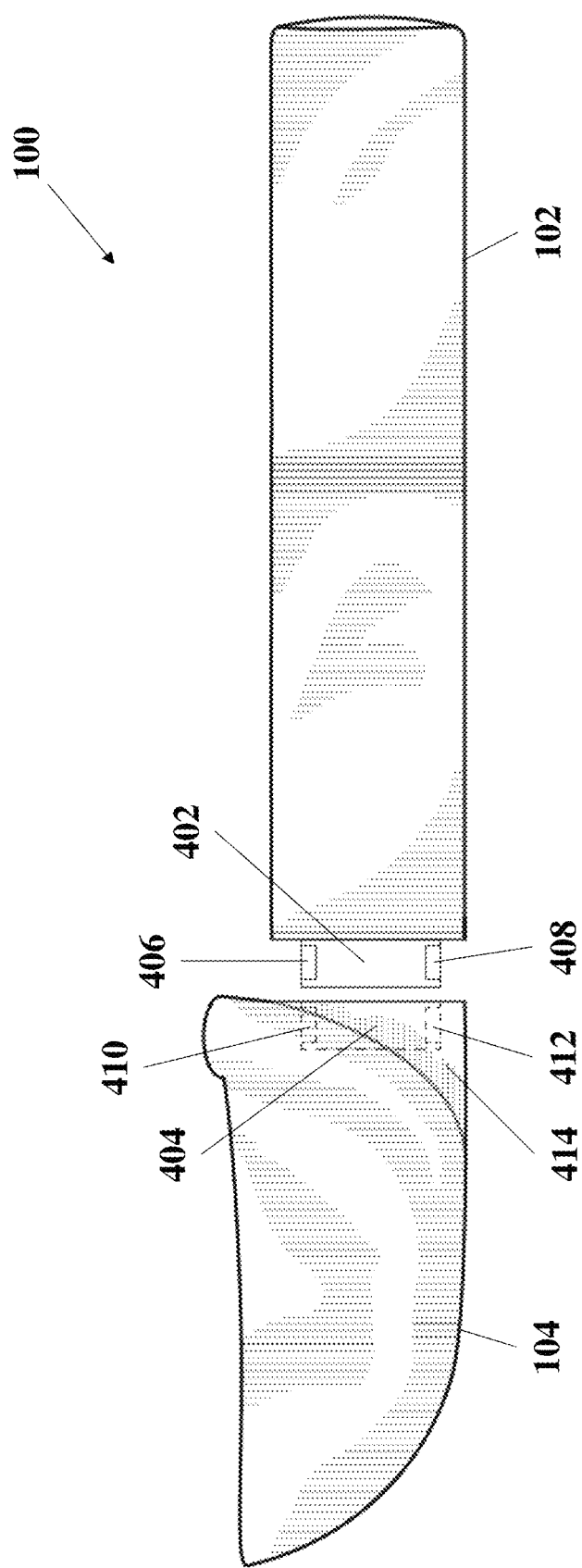
FIG. 4 displays a perspective view of a heated scooping device in a separated configuration.

FIG. 4 displays a perspective view of a heated scooping device 100 in a separated configuration. As shown, device 100 comprises an attachment means including a first attachment portion 402 associated with the top end 120 of handle portion 102 and a second attachment portion 404 associated with the back portion 126 of head portion 104 so that handle portion 102 and head portion 104 can be removably affixable with one another. In order for handle portion to be affixable with head portion 104, head portion 104 may include a bowl appendage 414 that may act as an extension of head portion 104 for the purposes of housing and or assisting with the attachment of a first pair of electrical contacts 406,408 and a second pair of electrical contacts 410,412.

In order for this embodiment of heated scooping device 100 to be consumer friendly, a first pair of electrical contacts 406,408 may be positioned adjacent first attachment portion 402 and a second pair of electrical contacts 410,412 may be positioned adjacent second attachment portion 404. The first pair of electrical contacts 406,408 may be affixed to wiring running directly or indirectly from power source 306 while the second pair of electrical contacts 410,412 may be affixed to wiring running directly or indirectly to heating element 110. Each pair of electrical contacts 406,408,410,412 are positioned so that once first attachment portion 402 and second attachment portion 404 are properly affixed to/positioned with one another, the first pair of electrical contacts 406,408 may be engaged with the second pair of electrical contacts 410,412, allowing electricity to flow from power source 306 to heating element 110.

It may be advantageous to consumers of device 100 if device 100 is able to be disassembled so that components such as power source 304 may be able to be efficiently replaced. In certain embodiments, first attachment portion 402 may be removably affixable to handle portion 102 so that power source 304 may be easily removed from device 100. In other embodiments, power source 304 may be removed out of bottom end 122 once bottom end 122 is removed from device 100. It is understood that in embodiments, power source 304 may comprise batteries, which are typically easily removable in consumer products made with easy-to-remove battery means. In other embodiments, power source 304 may be a power source other than a battery such as, but not limited to kinetic energy systems, solar energy systems, and external electrical systems.

In embodiments, various attachment and fitting techniques and equipment (fastening means, male-female engagement, welding, adhesives, magnets) may be utilized in any of the disclosed embodiments relating to FIG. 4 in order for first attachment portion 402 and second attachment portion 404 to properly attach themselves to and/or efficiently position themselves with one another and so that the heated scooping device 100 can efficiently and/or properly function by having the circuit with device 100 being completed. As an example, the first attachment portion 402 and second attachment portion 404 may comprise male and female threading. The pairs of electrical contacts 406,408, 410,412 may be positioned on first attachment portion 402 and second attachment portion 404 so that when first and second attachment portions 402,404 are fully twisted together, the pairs of electrical contacts 406, 408, 410,412 may be positioned adjacent one another, allowing for power to flow throughout the circuit in device 100.

In order to provide water-resistant/waterproof characteristics, in embodiments a gasket (not depicted) may be positioned in a depression so that gasket may efficiently seal the attachment site of first attachment portion 402 and second attachment portion 404. In other embodiments, additional gasket configurations may be utilized.

Figure 5:
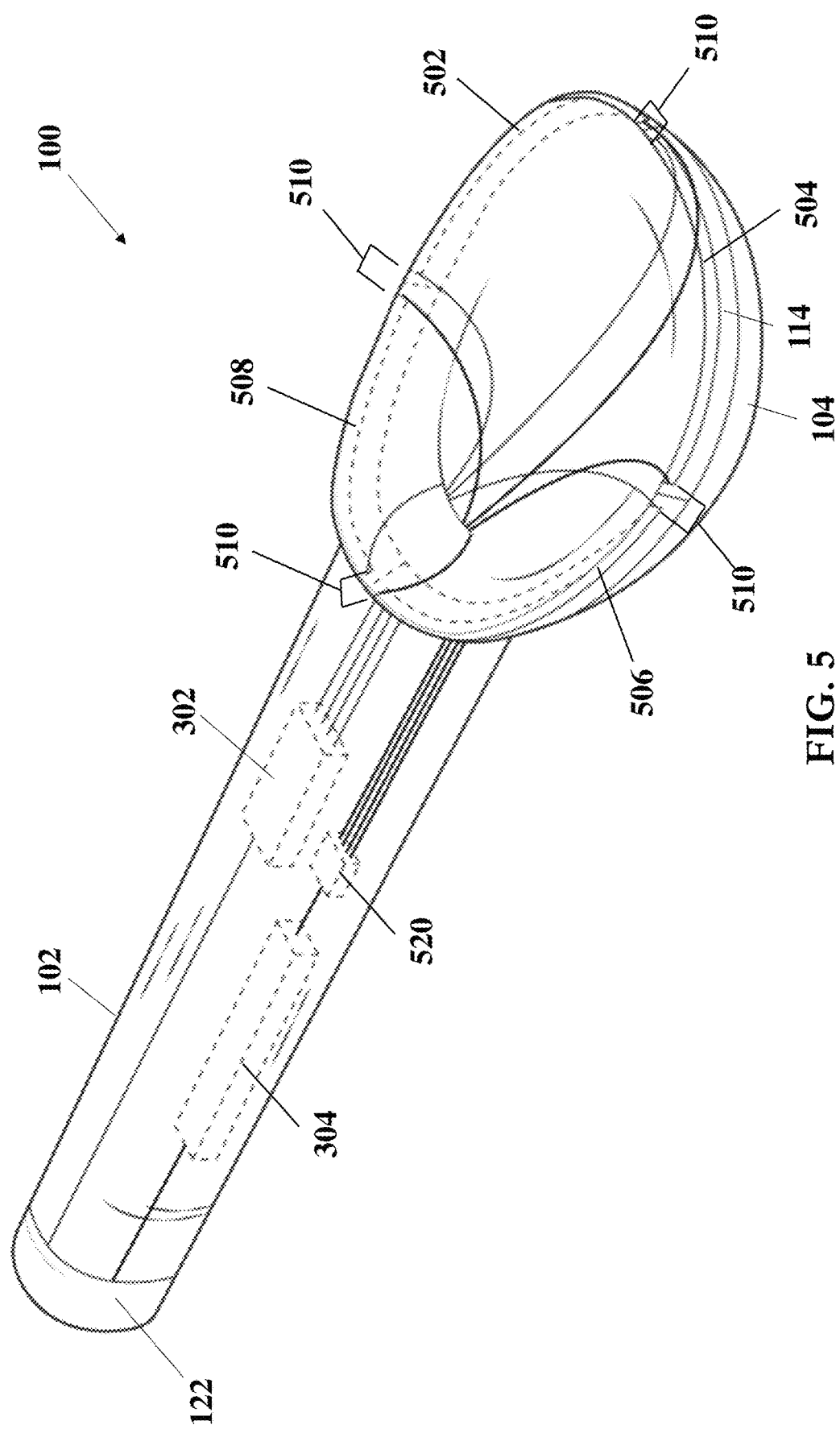
FIG. 5 displays a partially deconstructed view of a heated scooping device having multiple heating elements, as shown and described herein.

FIG. 5 displays a partially deconstructed view of a heated scooping device 100 having multiple heating elements 110. As shown, heating element 110 may extend the entirety of rim 108 and may be separated into four separate quadrants defined as first heating element 502, second heating element 504, third heating element 506, and fourth heating element 508. Ends of the four heating elements 502,504,506,508 may be separately wired to a microcontroller 302 and may be separated from one another via retainer projections 510. As shown, retainer projections 510 may comprise portions of two separate heating element retainers 114. In other embodiments, heating element retainer 114 may comprise a single piece so that retainer projections 510 may make up portions of a single heating element retainer 114. The four heating elements 502,504,506,508 may also be wired to a lead 520 that may contact/be wired to power source 304, which is then connected to bottom end 122 in order to complete the circuit in device 100.

In another embodiment, device 100 may comprise a single heating element 110 that extends around the periphery of rim 108 except for a single pair of retainer projections 510. Each one of the retainer projections 510 may include retainer orifices 230,240 housing bowl contacts 210,220 that are affixed to ends of heating element 110 in order to complete the circuit within device 100.

Microcontroller 302 may be capable of executing one or more programs for controlling the power to the four heating elements 502,504,506,508 in relation to one or more inputs. In this instance, the program may comprise temperature allocation protocol, which may allow microcontroller 302 to receive one or more of a plurality of user inputs constituting a plurality of heating configurations embodied in a multifaceted switch, which is not depicted, but may be integrated into bottom end 122 and may be fitted with components such as, but not limited to contacts, leads, wires, and springs that may allow the circuit embodied in device 100 to be completed by being able to receive and transmit electricity from one or more additional components in device 100. The user input may be used by the temperature allocation program to adjust power being sent to the four heating elements 502, 504,506,508 in order to supply power to one or more specific segments representative of a plurality of heating configurations.

Heating configurations, in embodiments, may include three main configurations that may each represent a hand scooping orientation for a user. A first heating configuration that may typically be utilized by a user who likes to scoop straight downward into comestibles (such as ice cream) may include power being sent to first heating element 502 and second heating element 504. A second heating configuration that may typically be utilized by a user who likes to scoop left-handed may include power being sent to second heating element 504 and third heating element 506. A third heating configuration that may typically be utilized by a user who likes to scoop right-handed may include power being sent to fourth heating element 508 and first heating element 502. In other embodiments, additional configurations including any combinations of the four heating elements 502,504,506,508 and/or less than four or more than four heating elements 110 may be utilized.

It is noted that one skilled in the art may conceive of how the multifaceted switch may be constructed and integrated within device 100.

In embodiments, various fittings and attachment techniques and equipment (fastening means, male-female engagement, welding, adhesives, magnets) similar to those mentioned previously in relation to FIG. 2 may be utilized in order for the four heating elements 502,504,506,508 to affix to heating element retainer 114 and for heating element retainer 114 to affix to heated scooping device 100.

In other embodiments, a covering (not depicted) made of a material similar to heating element 110 may be affixed to heating element retainer 114 and placed over heating elements 502,504,506,508 so that rim 108 of bowl section 106 may be uninterrupted.

Figure 6A:
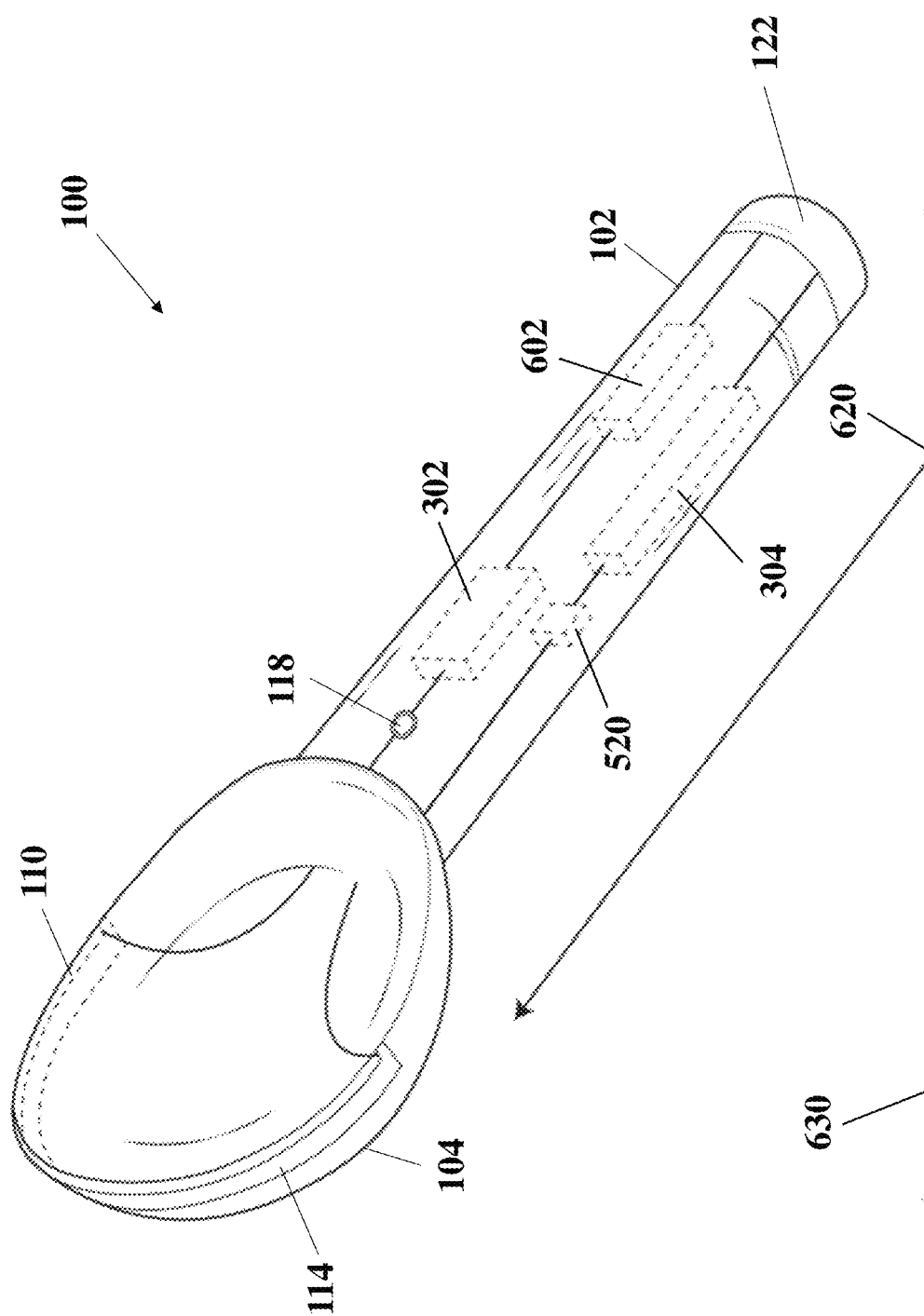
FIG. 6A displays a perspective view of a heated scooping device being held in an upward configuration, as shown and described herein.
Figure 6B:
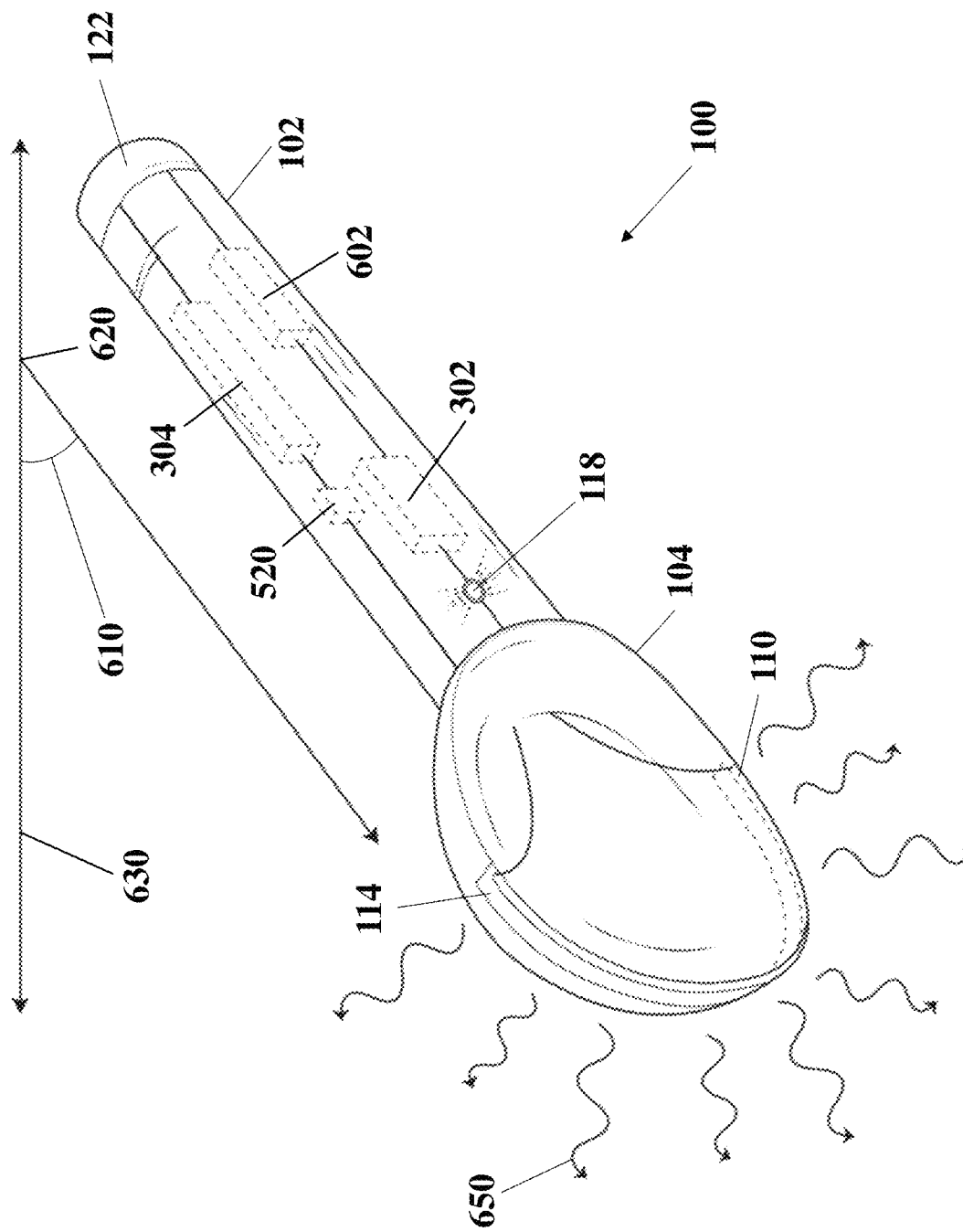
FIG. 6B displays a perspective view of a heated scooping device being held in a downward configuration, as shown and described herein.

FIGS. 6A and 6B display perspective views of a heated scooping device 100 being held in an upward configuration and a downward configuration, as shown and described herein. In the embodiments shown, heated scooping device 100 may be programmed to turn on when held below a pitch angle 610 in relation to a pitch axis 620 of heated scooping device 100 so that device 100 may automatically turn on when held in certain orientations. For reference, an orientation sensor 602 may utilize a three-dimensional coordinate system. A first dimension may be defined by a pitch axis 620, which extends along the width of heated scooping device 100 and may help define a specific pitch angle of device 100 (tilt of device 100 above or below the pitch axis 620). A second dimension may be defined by a roll axis 630, which extends along the length of heated scooping device 100 and may help define a specific roll angle of device 100 (rotation of device 100 above or below the roll axis 630). A third dimension may be defined by a yaw axis (not depicted), which extends downward (toward the ground) and may help define a specific yaw angle of device 100. For the purposes of this disclosure, the pitch axis 620 will be used as a reference to define an angle at which device 100 may turn on and off (below and above).

As shown, heated scooping device 100 may comprise an orientation sensor 602 that may provide input to microcontroller 302. For the purposes of this disclosure, orientation sensor 602 may utilize a built-in accelerometer, gyroscope and magnetometer in order to create a three-axis orientation output. Orientation sensor 602 may be wired to a microcontroller 302 which may receive input for sending power to heating element 110 (and thus releasing heat 650), which is representative of the at least one of a heating configuration (FIG. 6B) and a non-heating configuration (FIG. 6A). An indicator light 118 may be positioned between microcontroller 302 and heating element 110 and may light up when power is supplied from microcontroller 302 to heating element 110. Heating element 110 may also be wired to a lead 520 that may contact/be wired to power source 304, which is then connected to bottom end 122 in order to complete the circuit in device 100.

Microcontroller 302 may be capable of executing one or more programs for controlling the power to heating element 110 in relation to one or more inputs. In this instance, the program may comprise position-dependent temperature controller program protocol, which may allow microcontroller 302 to receive one or more of a plurality of user inputs constituting continuous orientation data related to the heated scooping device 100 and constitutes at least one of the heating configuration and the non-heating configuration. Heating configuration, an example of which is shown in FIG. 6A, may constitute a positioning of the head portion 104 at or below an angle (pitch angle 610) below a pitch axis 620 of orientation sensor 602. So as long as device 100 is oriented below pitch angle 610, microprocessor may continually send power to heating element 110 despite the roll angle of device 100. A non-heating configuration, as shown in FIG. 6B, may constitute a positioning of the head portion 104 at an angle above the pitch angle 610 of the orientation sensor 602.

In embodiments, the pitch angle 610 may be substantially 30 degrees. This may provide a safety measure for users because it may prevent device 100 from accidentally turning on when not being used to scoop comestibles. For example, device 100 may be placed steadily on an uneven surface where head portion 104 is angled towards the earth. Programming the pitch angle to be at least 30 degrees may prevent device 100 from accidentally turning on in this instance (as opposed to when the pitch angle 610 is programmed to be 0 degrees).

An additional safety measure may include device 100 found in FIGS. 6A and 6B comprising switch 116 that utilizes user input so that device 100 will not automatically turn on without a user actuating switch 116 first. In embodiments, switch 116 may be located on device 100 in a location other than that shown in FIG. 1 such as, but not limited to, on bottom end 122.

Figure 7B:
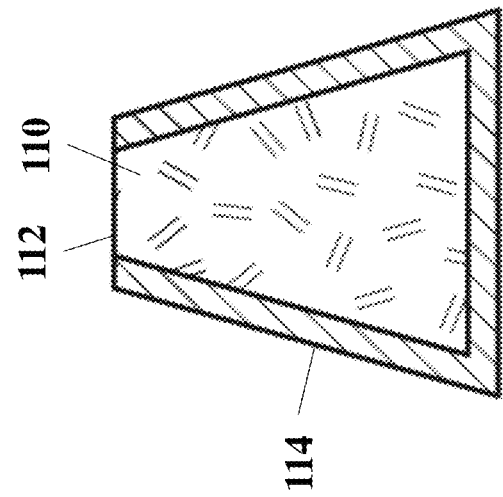
FIG. 7B displays a second cross-sectional configuration of a heating element and retainer, as shown and described.
Figure 7A:
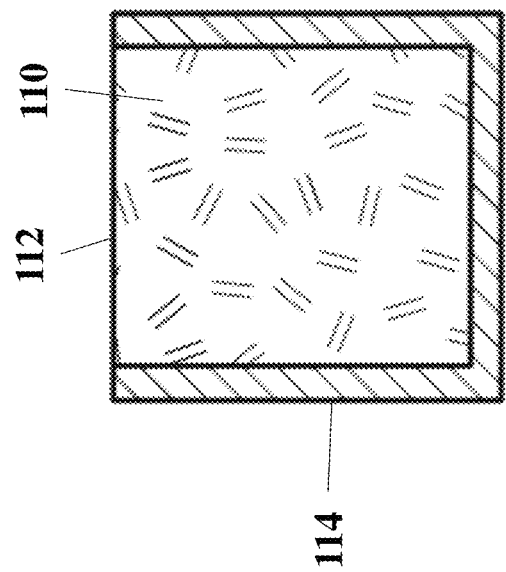
FIG. 7A displays a first cross-sectional configuration of a heating element and retainer, as shown and described.

FIGS. 7A and 7B display cross-sectional configurations of a heating element 110 and retainer 114, as shown and described. In the configurations shown in FIGS. 7A and 7B, retainer 114 may cover the majority of the surface area of heating element 110 so that the majority of the surface area of heating element 114 is thermally and electrically insulated from the rest of bowl section 106 and so that a single top edge, or cutting edge 112, is exposed for ease of and direct cutting/melting of comestibles. As shown in FIG. 7A, heating element 110 may comprise a quadrilateral cross-sectional shape with a single exposed edge while heating element 110 of FIG. 7B may comprise a substantially triangle shape/trapezoidal shape with a single upper exposed edge. Specifically concerning frozen comestibles, the minimal surface area exposure of cutting edge 112 may drastically reduce the heat lost from cutting edge 112 to a frozen comestible (since heating element 110 is covered by retainer 114). It is noted that heating element 110 may serve as a heat capacitor/reservoir for the exposed cutting edge 112 due to the insulation of a majority of the surface area of heating element 110 with retainer 114. The insulated heat may be directed to cutting edge 112 for a consistent additional supply of heat, which may lead to quicker heating times for cutting edge 112 as well as an easier and quicker scooping experience for a user. Due to this setup, cutting edge 112 found in FIG. 7B may increase in temperature In additional embodiments, device 100 may comprise multiple temperature sensors 306 (not depicted in figures), wherein one of the temperature sensors 306 may be affixed to the exposed cutting edge 112 and another of the temperature sensors 306 may be affixed to the covered lower section of heating element 110. The temperature sensors 306 may also be affixed to microcontroller 302 in order to provide temperature information on both the exposed cutting edge 112 and the covered lower section of heating element 110. Microcontroller 302 may execute code to adjust the power sent to retainer 114 based on the feedback provided from the multiple temperature sensors 306. As an example, microcontroller may include executable code relating to functions to perform when the exposed cutting edge 112 is below a minimum temperature threshold and/or when the covered lower section of heating element 110 exceeds a maximum temperature threshold. The threshold for exposed cutting edge 112 may represent a minimum temperature that is needed in order to easily, efficiently, and comfortably cut through a comestible with cutting edge 112 while the threshold for the covered lower section of heating element 110 may represent a maximum temperature threshold that is needed in order to protect the integrity of the material making up heating element 110. By having microcontroller execute the aforementioned code, heating element 110 may be continually fed an amount of electricity that may allow heating element 110 to produce an optimal working range of temperatures when a user scoops comestibles with device 100.

It is noted that for ease of manufacturing and/or costs, the combination of heating element 110 and retainer 114 may be manufactured in multiple ways. As shown in FIGS. 7A and 7B, retainer 114 may be wrapped around the entire surface area of heating element 110. Once retainer 114 is wrapped around heating element 110, an upper portion of the heating element 110/retainer 114 combination may be removed so that only a minority of the surface area is exposed (cutting edge 112). It is noted that this configuration of heating element 110 may provide the least potential heat and/or electricity exposure to a user of device 110, allowing for a safer experience for the user. In addition, the configuration may lead to minimal heat lost from the device 100, leading to an overall higher efficiency.

In other embodiments, retainer 114 may be molded to a majority of a lower portion of heating element 110 so that the upper portion of heating element 110 not covered by retainer 114 is exposed. The exposed upper portion may comprise the remainder of the shape of heating element 110. For example, if heating element 110 comprises a triangular prism shape, retainer 114 may cover a majority of heating element 110 and a tip of the triangle (heating element 110) may be exposed at the top of the heating element 110/retainer 114 combination.

In embodiments, heating element 110 may comprise a substantially triangular shape and may vary in thickness at its base. In order to account for the concavity of bowl section 106, heating element 110 may comprise a first concave side and a second convex side (that are both not the base of the triangle) that match with the concavity of bowl section 106 so that device 100 may comprises a seamless surface. In other embodiments, retainer 114 may vary in thickness based on the material making up heating element 110.

Figure 8:
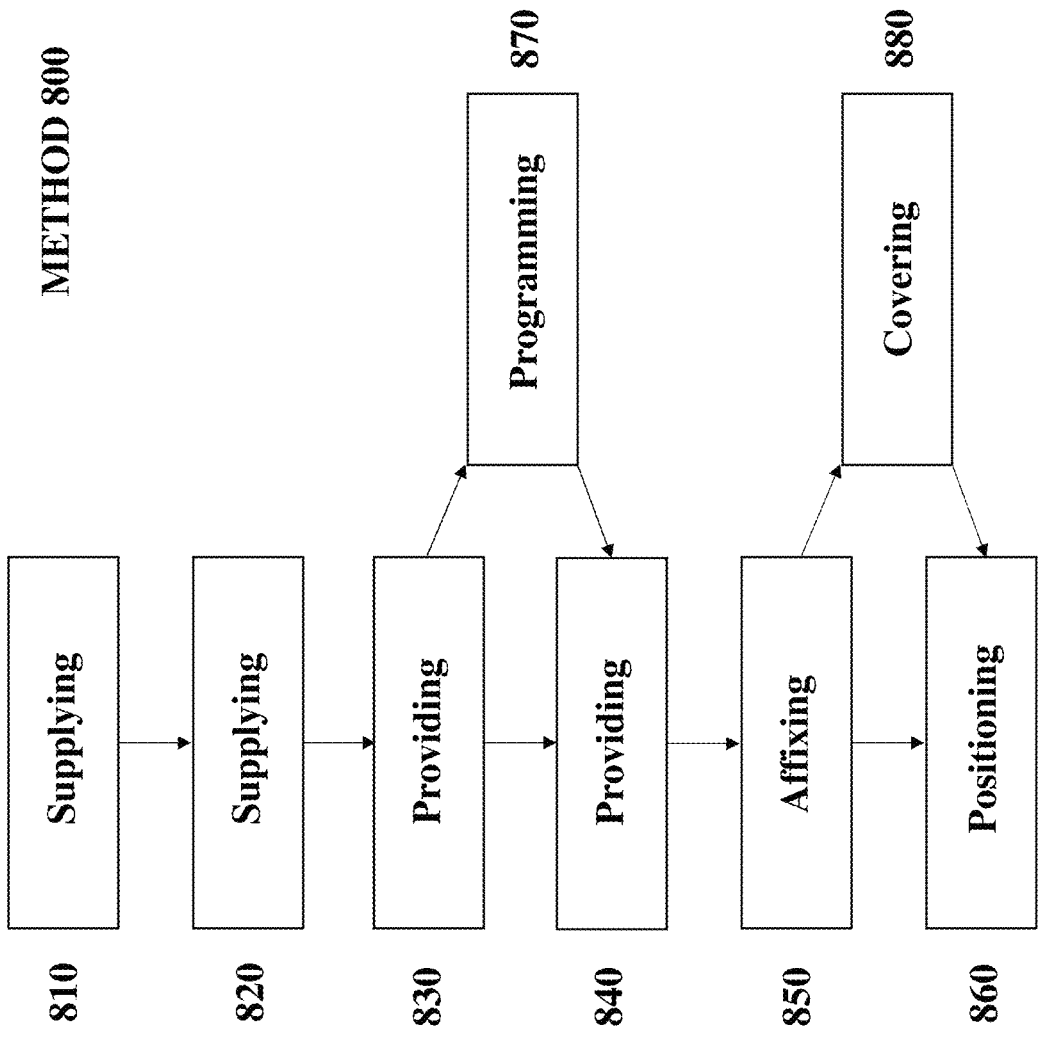
FIG. 8 displays a method for manufacturing a heated scooping device, as shown and described.

FIG. 8 displays a method 800 for manufacturing a heated scooping device 100, as shown and described. Method 800 may include supplying 810 a head portion 104 having a bowl section 106 and a rim 108 and supplying 820 a handle portion 102. A heating means may be provided 830 for supplying heat to at least a portion of the heated scooping device 100. The heating means may include a heating element 110 at least partially circumnavigating rim 108 and a heating unit (microcontroller 302, switch 116, etc.) wired to heating element 110 that supplies electricity to heating element 110. A power means (such as, but not limited to power source 304) wired to the heating means may be provided 840 for supplying power to the heating means. Once internal componentry is properly positioned, handle portion 102 may be affixed 850 to head portion 104 and a retainer 114 may be positioned 860 between bowl section 106 and heating element 110 for electrically and thermally isolating heating element 110 from bowl section 106. In embodiments, prior to the positioning 860, a majority of heating element 110 may be covered 880 by retainer 114 to form cutting edge 112 (or exposed edge) configured to puncture comestibles.

In embodiments, device may comprise a microcontroller 302 that may be capable of executing two or more of the following programs for controlling the power to heating element 110: a PID temperature controller program, a temperature allocation program, and a position-dependent temperature controller program. In this instance, microcontroller 302 may be programmed to handle instructions from the following inputs: one or more heating elements 110, a switch 116, a power source 304, a temperature sensor 306, an indicator light 118, an orientation sensor 602, and a multifaceted switch. In the case where a configuration of device 100 utilizes more than one heating element 110, a temperature sensor 306 may be wired to each end of each heating element 110 and back to microcontroller 302.

In embodiments, method 800 may comprise additional steps that may include specific configurations of elements found in this disclosure. For example, microcontroller 302 of heating unit may be programmed 870 to be capable of executing one or more programs for controlling power to heating element 110 in relation to one or more inputs. In other embodiments, microcontroller 302 may be programmed to be capable of executing any of the programs disclosed.

In embodiments, heating element 110 may comprise a semiconductor material. In further embodiments, heating element 110 may comprise a thermistor including materials such as, but not limited to nichrome, tungsten, silver, nickel, strontium, barium, lead titanates, metal oxides, and various alloys. In other embodiments, heating element 110 may comprise any material that a typical thermistor may embody. In additional embodiments, heating element 110 may comprise a material with a high resistivity.

In embodiments, in order to provide a safer and more efficient product to users, bowl section 106 may include one or more coatings that may comprise low electrical conductivity, low thermal conductivity and/or a low heat transfer coefficient so that electricity and/or heat may not spread through bowl section 106. Coatings may include, but are not limited to polymers (including epoxies and polyurethanes) and ceramic. In embodiments, retainer 114 may comprise any of the aforementioned coatings so that electricity and/or heat may not be transferred from rim 108/heating element 110 to bowl section 106. In embodiments, heating unit 110 may comprise only switch 116. In other embodiments, heating unit 110 may comprise only a microcontroller 302 capable of executing one or more programs. In other embodiments, heating unit 110 may comprise a plurality of microcontrollers 302 each capable of executing a single program. In other embodiments, heating unit 110 may comprise switch 116 and at least one of a microcontroller 302 capable of executing one or more programs and a plurality of microcontrollers 302 each capable of executing a single program.

In embodiments, microcontroller 302 may comprise executable code that, when run, is capable of running multiple programs. In other embodiments, heated scooping device 100 may comprise multiple microcontrollers 302 that may each run a single program. For example, one of the microcontrollers 302 may be configured to run a PID temperature control program and another of the microcontrollers 302 may be configured to run a temperature allocation program.

In embodiments, microcontroller 302 may comprise executable code that, when run, is capable of shutting off the flow of power to heating element 110 and thus reducing the heat in heating element 110. In this embodiment, temperature sensor 306 may be a sensor that detects electricity parameters (such as charge, current, voltage, etc.); when a user's skin contacts heating element 110, the electricity parameters change since the body of a user is conductive. When microcontroller 302 receives this change in electricity parameter data, microcontroller 302 may execute code to shut off the electricity being sent to heating element 110. This action may prevent a user from becoming burned by heating element 110. In addition, it is advantageous that the portion of heating element 110 that is exposed is small in surface area compared to the entirety of heating element 110 so that there is minimal risk of injury from heat dissipated from heating element 110.

It is further noted that in embodiments, front portion 124 of head portion 104 may be denoted as the section of head portion 104 that is adjacent the hemispherical shape of heating element 110 and extends as far as heating element 110 extends along rim 108, while the back portion 126 of head portion 104 may be denoted as the section of head portion 104 that is the remainder of the head portion 104 not defined as the front portion 124 of head portion 104 and that is affixable to the top end 120 of handle portion 102.

In embodiments, various attachment and fitting techniques and equipment (fastening means, male-female engagement, welding, adhesives, magnets) may be utilized in any of the disclosed embodiments in order for components of the embodiments to properly attach themselves to and/or efficiently position themselves with one another and so that the heated scooping device 100 can efficiently and/or properly function. As an example, the heated scooping device 100 may include elements making up a heating element retainer 114 affixed via male-female engagement and magnets, as opposed to a heating element retainer 114 affixed via adhesives.

It is noted that device 100 may be utilized to efficiently scoop ice cream. Device 100 may avoid unnecessary melting or changes in viscosity of a comestible by only applying electricity (and therefore heat) to heating element 110 of rim 108. Since heat is supplied only to rim 108 and not to the rest of bowl section 106, efficient scooping and cutting of comestibles may occur without any additional heat input from the rest of bowl section 106 messing up the consistency of the comestible. In addition, device 100 may be capable of efficiently scoop other comestibles besides ice cream that may be frozen and/or have a high viscosity and/or density.

For the purposes of this disclosure, the terms "first heating element", "second heating element", "third heating element", and "fourth heating element" may be collectively referred to as a "heating element".

For the purposes of this disclosure, the terms "cutting edge" and "exposed edge" may be synonymous.

For the purposes of this disclosure, the terms "heating element retainer" and "retainer" may be synonymous.

A plurality of additional features and feature refinements are applicable to specific embodiments. These additional features and feature refinements may be used individually or in any combination. It is noted that each of the following features discussed may be, but are not necessary to be, used with any other feature or combination of features of any of the embodiments presented herein.

Unless otherwise defined, all technical and scientific terms used herein have the same meanings as are commonly understood by one of ordinary skill in the art to which this disclosure belongs. Although methods similar or equivalent to those described herein can be used in the practice or testing of the present disclosure, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present disclosure is not limited to what has been particularly shown and described hereinabove. Rather, the scope of the present disclosure is defined by the appended claims and includes both combinations and sub-combinations of the various features described hereinabove as well as variations and modifications thereof, which would occur to persons skilled in the art upon reading the foregoing description.

I claim:

1. A heated scooping device, comprising:
    a head portion having a bowl section and a rim, the head portion affixed to a handle portion extending from the head portion;
    a heating means for supplying heat to at least a portion of the heated scooping device, the heating means comprising:
        a heating element at least partially circumnavigating the rim, wherein the heating element has a high electrical resistivity to mitigate electrocution of a user and acts as a thermal conductor to heat an edge of the heating element; and
        a heating unit wired to the heating element, the heating unit supplying electricity to the heating element;
    a power means for supplying power to the heating means; and
    a retainer positioned between the bowl section and the heating element, wherein the retainer has a low electrical conductivity and a low thermal conductivity to help electrically and thermally isolate the heating element from the bowl section.

2. The device of claim 1, wherein the heating unit further comprises a switch for controlling the flow of electricity to the heating element.

3. The device of claim 1, wherein the head portion is removably affixable to the handle portion.

4. The device of claim 1, further comprising an indicator light integral with at least one of the handle portion and the head portion.

5. The device of claim 1, wherein the heating element extends in a range between 90 degrees and 180 degrees of the rim at a front portion of the bowl section.

6. The device of claim 1, wherein a majority of the heating element is covered by the retainer except for an exposed edge configured to puncture comestibles.

7. The device of claim 1, wherein the heating unit further comprises a microcontroller capable of executing one or more programs for controlling the power to the heating element in relation to one or more inputs.

8. The device of claim 7, wherein the microcontroller is wired to a temperature sensor and is capable of executing a PID temperature controller program for adjusting the power sent to the heating element in response to the one or more inputs.

9. The device of claim 8, wherein a first of the one or more inputs comprises continuous temperature data related to the heating element and a second of the one or more inputs comprises a plurality of user inputs constituting a plurality of temperature settings embodied in a multifaceted switch, the first and second of the one or more inputs relayed from the temperature sensor and the multifaceted switch to the microcontroller in order to supply power to the heating element representative of the plurality of temperature settings.

10. The device of claim 7, wherein the microcontroller is wired to separate segments of the heating element and is capable of executing a temperature allocation program for allocating power to one or more specific segments of the separate segments in response to the one or more inputs.

11. The device of claim 10, wherein the one or more inputs comprises a plurality of user inputs constituting a plurality of heating configurations embodied in a multifaceted switch, the one or more inputs relayed from the multifaceted switch to the microcontroller in order to supply power to the one or more specific segments representative of the plurality of heating configurations.

12. The device of claim 11, wherein the plurality of heating configurations includes at least: a front left segment and a front right segment; the front left segment and a back left segment; and the front right segment and a back right segment.

13. The device of claim 7, wherein the microcontroller is wired to an orientation sensor and is capable of executing a position-dependent temperature controller program for adjusting the power sent to the heating element in response to the one or more inputs.

14. The device of claim 13, wherein the one or more inputs comprises continuous orientation data related to the heated scooping device and constitutes at least one of a heating configuration and a non-heating configuration, the one or more inputs relayed from the orientation sensor to the microcontroller in order to supply power to the heating element representative of the at least one of a heating configuration and a non-heating configuration.

15. The device of claim 14, wherein the heating configuration constitutes a positioning of the head portion at or below an angle below a pitch axis of the orientation sensor and the non-heating configuration constitutes a positioning of the head portion at an angle above the angle below the pitch axis of the orientation sensor.

16. The device of claim 15, wherein the angle below the pitch axis is greater than 30 degrees.

17. A heated scooping device, comprising:
a head portion having a bowl section and a rim, the head portion affixed to a handle portion extending from the head portion;
a heating element positioned along at least a portion of the rim;
a heater configured to supply power to and generate heat in a heating element;
a power source for supplying power to the heater; and
a retainer positioned between the bowl section and the heating element, wherein the retainer has a low electrical conductivity and a low thermal conductivity and electrically and thermally isolates the heating element from the bowl section.

18. The heated scooping device of claim 17, further comprising:
a temperature sensor coupled to the heater, wherein the heater adjusts the power to the heating element in response to the temperature sensor and/or a temperature setting.

19. The heated scooping device of claim 17, wherein the heating element includes a plurality of segments, wherein the plurality of segments are configured to be separately powered by the heater and have varying temperature settings; and
wherein the heater obtains temperature settings for each of the plurality of segments from one or more user inputs and provides power to one or more of the plurality of segments in response to the temperature settings.

20. The heated scooping device of claim 17, further comprising:
an orientation sensor coupled to the heater, wherein the orientation sensor provides orientation data associated with the heated scooping device to the heater; and
wherein the heater adjusts power to the heating element in response to the orientation data.

21. A heated scooping device, comprising:
a head portion having a bowl section with an outer rim, the head portion affixed to a handle portion extending from the head portion;
a heating element positioned along at least two portions of the outer rim, wherein the heating element includes a first segment located on a first portion of the outer rim and a second segment located on a second portion of the outer rim;
a heater configured to supply power to and generate heat in the heating element, wherein the heater separately heats and varies the temperature between the first segment and the second segment of the heating element;
a power source for supplying power to the heater; and
a retainer positioned between the bowl section and the heating element on the outer rim, wherein the retainer has a low electrical conductivity and a low thermal conductivity and electrically and thermally isolates the heating element from the bowl section.

* * * * *